(12) United States Patent
Kaijima et al.

(10) Patent No.: US 8,301,607 B2
(45) Date of Patent: Oct. 30, 2012

(54) INFORMATION MANAGEMENT SERVER, INFORMATION PROCESSING SYSTEM, COMMUNICATION METHOD AND PROGRAM

(75) Inventors: Soh Kaijima, Kanagawa-ken (JP); Gou Nakashima, Kanagawa-ken (JP); Masahiro Okawa, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 12/503,308

(22) Filed: Jul. 15, 2009

(65) Prior Publication Data
US 2010/0017442 A1      Jan. 21, 2010

(30) Foreign Application Priority Data

Jul. 18, 2008   (JP) .................. 2008-186708

(51) Int. Cl.
*G06F 7/00*   (2006.01)
*G06F 17/00*  (2006.01)

(52) U.S. Cl. ...................................... 707/702

(58) Field of Classification Search .................. 707/634, 707/702
See application file for complete search history.

(56) References Cited

U.S. PATENT DOCUMENTS

| | | | | |
|---|---|---|---|---|
| 5,682,537 A | * | 10/1997 | Davies et al. | 710/200 |
| 2003/0101190 A1 | * | 5/2003 | Horvitz et al. | 707/100 |
| 2006/0206532 A1 | * | 9/2006 | MacLaurin | 707/200 |

* cited by examiner

*Primary Examiner* — Van Oberly
(74) *Attorney, Agent, or Firm* — Jeffrey T. Holman

(57) ABSTRACT

An embodiment of the invention includes an information management server with a registration unit that registers a status change condition of a database and a notification action so that they are associated with each other. Also, the information management server includes a communication unit that receives an acquisition request for a status change notification via database connection established with respect to a client and a change detection unit that detects a status change satisfying the condition of the acquisition request and invokes the notification action associated therewith. According to aspect of the invention, a notification unit causes the communication unit to send a notification including a result of the notification action via the database connection as a response to the acquisition request, and returns control of the connection to the client.

16 Claims, 12 Drawing Sheets

```
CREATE TRIGGER NEW_HIRED
    AFTER INSERT ON EMPLOYEE
    FOR EACH ROW
    UPDATE COMPANY_STATS SET NBEMP=NBEMP+1
```

FIG. 12A

```
CREATE TRIGGER REORDER
    AFTER UPDATE OF ON_HAND, MAX_STOCKED ON PARTS
    REFERENCING NEW AS N
    FOR EACH ROW
    WHEN (N.ON_HAND<0.10 * N.MAX_STOCKED)
    BEGIN ATOMIC
    VALUES(ISSUE_SHIP_REQUEST(N.MAX_STOCKED – N.ON_HAND, N.PARTNO));
```

FIG. 12B

INFORMATION MANAGEMENT SERVER, INFORMATION PROCESSING SYSTEM, COMMUNICATION METHOD AND PROGRAM

FIELD

Embodiments of the invention relate to the database field, and more specifically relates to mechanism for notifying a database client of a change in a database status.

BACKGROUND

In recent years, government and municipal offices, companies and the like have widely constructed a large scale database system to manage enormous volumes of data generated with various operations. The usage of such database also has been diversified, including a general business database as well as a workflow management system of recording plans and actual achievement of an operation so as to manage the progress of a project, for example. A database system further has been utilized to realize a traceability system of recording various types of operation histories of manufacturing, shipping and transaction, thus enabling the prompt access to the information if required.

For the above-stated usage for the workflow management and traceability, there is a demand to generate a certain action in response to a status change in the database (insert, update, or delete), for example. For the workflow management use, for example, there is a demand to generate a new operation followed in response to the completion of one operation. For the traceability use, to keep up with the database state changing momentarily, there is a demand to display an alert in response to the registered event generation. There is another demand for a client GUI (Graphical User Interface) application, which is for displaying in response to a database status, to reflect a status change promptly.

In association with the above-stated actions conducted in response to a status change in a database, a conventional database management system (DBMS) is equipped with a trigger function that invokes processing designated beforehand in response to a status update of the database registered beforehand (insert, update, or delete). This function is used for processing of reflecting a change made to one of a plurality of databases and tables, having contents operatively associated with each other, on the other databases and tables.

FIG. 12 illustrates an exemplary sentence of a statement using the trigger function. FIG. 12A illustrates an exemplary sentence of a statement defining, when a record is added to an EMPLOYEE table, a trigger to increase the number of NBEMP of a COMPANY_STATS table by one. FIG. 12B illustrates an exemplary sentence of a statement defining, when the number of products in stock is less than MAX_STOCKED, a trigger to send an order sheet for additional components using a user-defined function (ISSUE_SHIP_REQUEST) to an order-receiver. In this way, the trigger function of DBMS allows an action to be generated in response to a status change in a database (insert, update or delete).

Meanwhile, as mechanism of letting a database client (hereinafter referred to as a DB client) detect such a status change in the database, a polling system is available, for example, which issues a SQL statement regularly to acquire data and checks whether or not insert, update or delete has been conducted with respect to the data. As another mechanism of detecting a status change in a database, an event notification system using external mechanism is available, which utilizes the trigger function of DBMS and a MQ (Message Queuing) function that provides a communication function among applications to detect a status change in a database (insert, update or delete) using a trigger of the database, and sends a message to a client by using the external MQ. An application-compatible system also is available, which enables a closer linkage among a plurality of applications that use a database so that an application that conducted insert, update or delete of data can notify another application that should execute the following action in response to the status change.

SUMMARY OF AN EMBODIMENT OF THE INVENTION

In response to an acquisition request for a status change notification of a database received from a client via database connection, the information management server detects generation of the status change registered, and sends as a response a notification including a result of the notification action invoked to the client via the database connection while returning control of the connection to the client. A notification action is registered in association with a status change in the database serving as a trigger thereof.

According to another aspect of an embodiment of the invention, the information management server further may include a cancellation unit that gives an acquisition error of the status change notification as the result in response to generation of an event serving as a trigger of canceling execution of acquisition processing of the status change notification. Thereby, even before detecting the status change satisfying acquisition request conditions, if the notification becomes unnecessary, the client can withdraw the acquisition request, thus making it possible to release the database connection kept for the status change notification to different processing.

According to one embodiment the cancellation unit may be a timer unit that starts to operate in response to an acquisition request for the status change notification, and gives expiration of acquisition time-limit of the status change notification in response to the expiration as the result. The cancellation unit may be an interruption unit that gives acquisition interruption of the status change notification as the result in response to an interruption instruction received via different database connection. The cancellation unit may be the communication unit gives acquisition interruption of the status change notification as the result in response to disconnection of database connection having a dependence relationship designated with the status change notification. Thereby, even before detecting the status change satisfying the acquisition request, the client can withdraw an acquisition request with a high degree of flexibility at various timings such as at a timing designated explicitly by an interruption request, at a timing when it reaches a predetermined timeout limit, and a timing when database connection with a dependence relationship designated beforehand is disconnected.

According to another aspect of an embodiment of the invention, the information management server may include: a creation unit that defines a status change notification including a status change serving as a trigger and a notification action and causes the status change notification to be stored persistently; a start unit that reads out the definition, sets the status change serving as the trigger as a target of detection by the change detection unit, and starts processing operation of the status change notification; and a deletion unit that erases the definition and deletes the status change notification.

In response to a start request for the status change notification defined beforehand that is received via the database connection, the start unit secures an identifier for identifying the client, a key indicating the existence or not of the status change rewritten by the change detection unit, and a storage region for storing a result of the notification action, so as to start the operation of the required status change notification processing. The status change in the database stated above may include insert, update or delete of elements with respect to a table of the database.

BRIEF DESCRIPTION OF THE DRAWINGS

FIG. 12 illustrates exemplary sentences of a statement using a trigger function according to an embodiment of the invention.

DETAILED DESCRIPTION

The following describes the present invention by way of embodiments, which are not intended to limit the present invention thereto. In the following embodiments, a database system (hereinafter referred to as a DB system) is exemplified as an example of the information processing system, including a database server (hereinafter referred to as a server) as an information management server that manages a database and a database client (hereinafter referred to as a client) connected with the server via a network.

Figure 1:
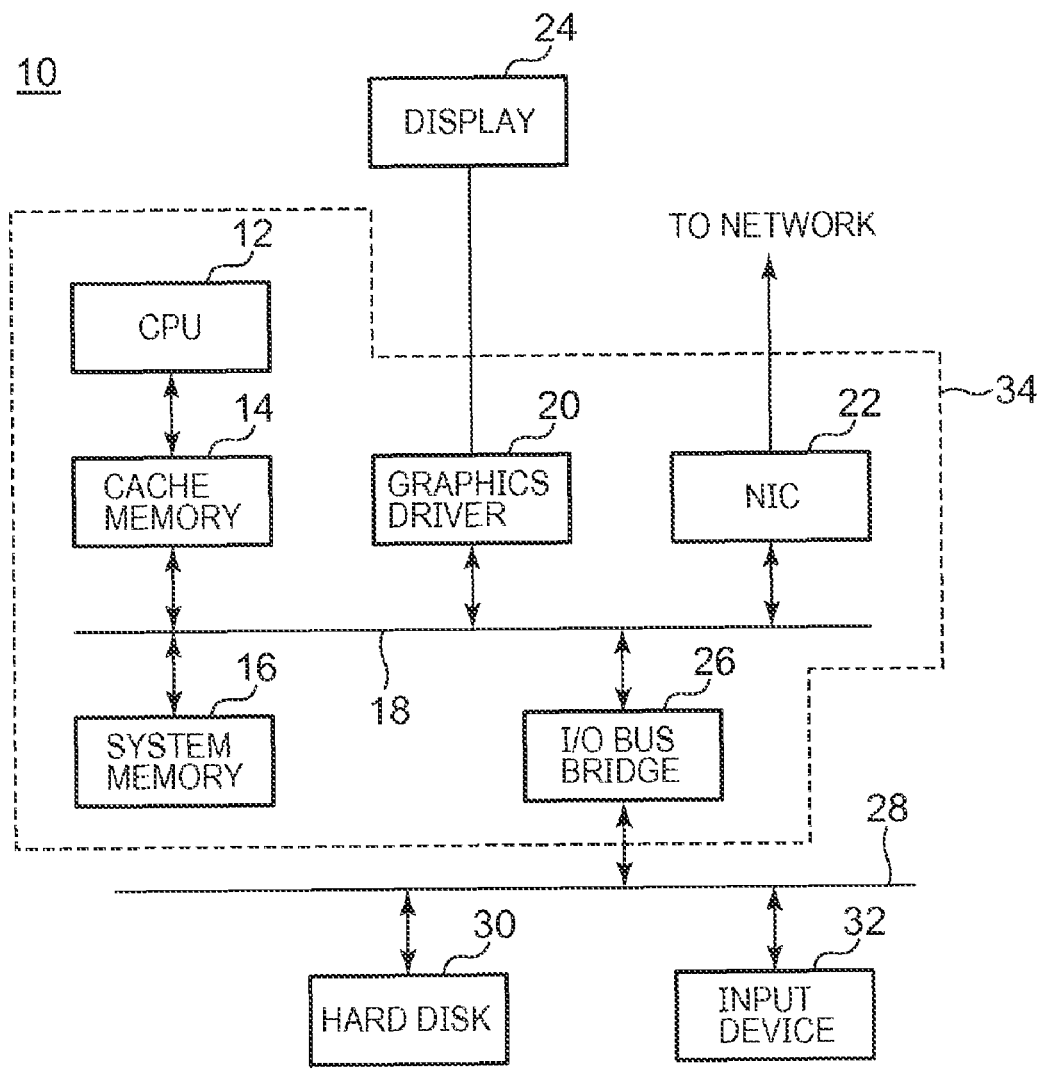
FIG. 1 illustrates an embodiment of the hardware configuration of a database server according to an embodiment of the invention.

Firstly, the following describes the hardware and software configuration of the server 10 making up the DB system of the present embodiment. FIG. 1 illustrates an embodiment of the hardware configuration of the server 10. The server 10 shown in FIG. 1 is roughly configured as a computer device 34 such as a personal computer, a work station, or a main frame. The computer device 34 illustrated in FIG. 1 includes: a central processing unit (CPU) 12; a cache memory 14 having levels such as L1 and L2 enabling high-speed access to data used by the CPU 12; and a system memory 16 made up of a solid-state memory element such as a RAM or a DRAM enabling the processing by the CPU 12.

The CPU 12, the cache memory 14 and the system memory 16 are connected with other devices and drivers such as a graphics driver 20 and a network interface card (NIC) 22 via a system bus 18. The graphics drive 20 is connected with an external display 24 via a bus, thus making it possible to display a processing result by the CPU 12 on a display screen. The NIC 22 allows the connection of the server 10 with a network using appropriate communication protocol such as TCP/IP at a physical layer level and a data link layer level.

Connected further to the system bus 18 is an I/O bus bridge 26. On the downstream side of the I/O bus bridge 26, a hard disk 30 is connected via an I/O bus 28 such as PCI by means of IDE, ATA, ATAPI, serial ATA, SCSI, USB or the like. The hard disk 30 provides a storage region for storing data of the database of the present embodiment. Connected further to the I/O bus 28 is an input device 32 such as a keyboard and a pointing device like a mouse via a bus such as USB, and the input device 32 provides user interface. An operator may use the input device 32 or conduct remote access via the NIC 22 to instruct the computer device 34 to conduct operations such as a maintenance operation of the database and an operation of defining an event notification trigger described later.

As the CPU 12 of the computer device 34, any single core processor or multicore processor may be used, more specifically including a CISC or RISC chip such as Xeon®, Itanium®, POWER5™, POWER6™ or POWER PC®.

The server 10 may be controlled by an operating system (hereinafter referred to as OS) such as WINDOWS® 200X, UNIX®, z/OS, or LINUX®, which implements a database management system (DBMS) that manages a database such as a relational database, an object relational database, a hierarchical database, a network database, or an XML (extensible Markup Language) database. The client also can be implemented with a hardware configuration similar to that illustrated in FIG. 1.

Figure 2:
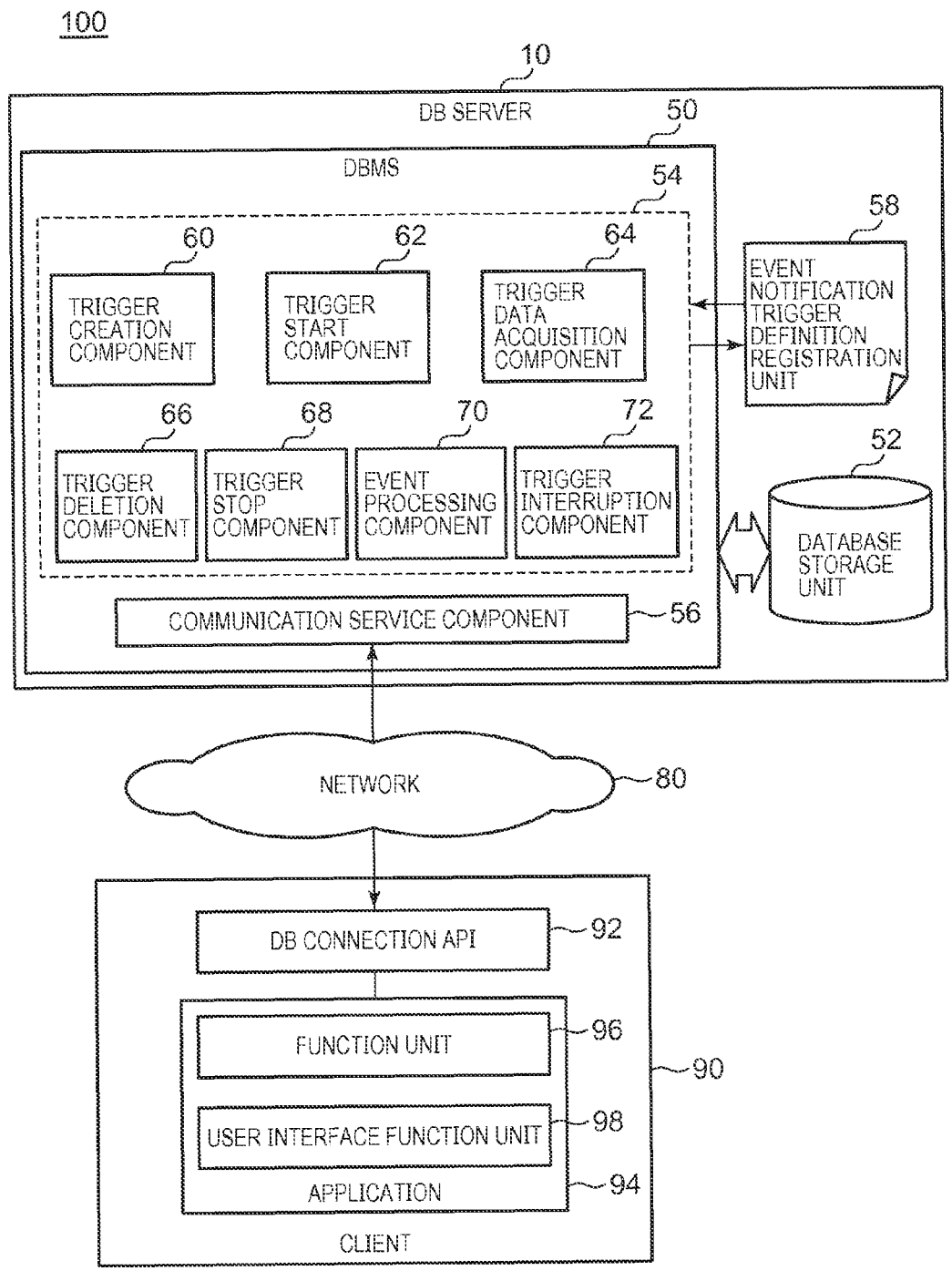
FIG. 2 illustrates a functional block of a database system implemented on a database server and a database client of the present embodiment according to an embodiment of the invention.

The following describes the functional configuration of the DB system of the present embodiment. FIG. 2 illustrates a functional block 100 of the DB system embodied on the server 10 and the client 90 of the present embodiment. The functional block 10 illustrated in FIG. 2 includes the functional configuration of the server 10 and the client 90. The server 10 and the client 90 communicate with each other via a network 80 such as a local area network (LAN) in accordance with communication protocol of Ethernet® or TCP/IP.

The server 10 includes a database management system (hereinafter referred to as DBMS) 50 and a database storage unit 52. The following describes an example using a relational database for convenience in description. The database storage unit 52 includes the hard disk 30 illustrated in FIG. 1, which stores data in the format accessible by a computer. The DBMS 50 is an application for operating and managing a database, which is provided with a database language such as SQL, controls transaction processing with the client 90 in accordance with ACID characteristics, and provides the client 90 with access to data within the database storage unit 52.

The DBMS 50 of the present embodiment includes a communication service component 56 that controls communication with the client 90 and provides database connection, and an event notification trigger component group 54 that embodies an event notification trigger function of the present embodiment. The communication service component 56 is implemented as a communication unit of the present embodiment on the computer together with hardware resource such as the NIC 22 illustrated in FIG. 1. The event notification trigger function refers to a function of notifying the client 90 of an event in response to a database status change event serving as a trigger such as an operation of INSERT, UPDATE, or DELETE of data with respect to a table or the like on the database. In the DB system of the present embodiment, a plurality of event notification triggers can be registered, each including a status change event serving as a trigger and an action to be invoked in response thereto as a pair.

The server 10 further includes an event notification trigger definition registration unit 58 that stores data to define the registered event notification triggers so as to register the event notification triggers. The event notification trigger definition registration unit 58 includes a storage region provided by the hard disk 30 and the like, which stores the definition data so as to be accessible by each component of the event notification trigger component group 54 and is implemented on the computer as a registration unit of the present embodiment.

In order to enable remote access to the DBMS 50 of the server 10, the client 90 is equipped with a database connection API (hereinafter referred to as DB connection API) 92 configured as a common interface (Application Programming Interface; API) such as JDBC or ODBC (Open Database Connectivity) or other APIs specific to each DBMS, thus making it possible to access to the database. An application 94, which is executed on the client 90 and uses data on the database, accesses the database via the API. More specifically, the application 94 includes a function unit 96 that handles business logic and a user interface function unit 98. In the present embodiment, the function unit 96 and the user interface function unit 98 execute processing that requires notification on a database status change.

The application 94 uses the DB connection API 92 to access the server 10, thus establishing database connection with the DBMS 50 and issuing a statement written in a database language such as SQL via the database connection. Returning now to the description on the server 10, the DBMS 50 interprets the statement issued by the application 94, executes processing required using various components, and sends a response to the client 90 including a result of the processing.

More specifically, the above-stated event notification trigger component group 54 includes a trigger creation component 60 that creates an event notification trigger and a trigger deletion component 66 that deletes the created event notification trigger from the system. The event notification trigger component group 54 further includes a trigger start component 62 that starts an operation of the created event notification trigger and a trigger stop component 68 that stops the operation of the started event notification trigger.

The event notification trigger component group 54 further includes a trigger data acquisition component 64 and an event processing component 70. The trigger data acquisition component 64 receives an acquisition request for event notification received from the client 90 via the database connection, with respect to the event notification trigger during operation. When insert, update, or delete is conducted to data concerning any table of the database, the event processing component 70 receives notification of such, and judges whether or not the event is a status change event serving a trigger of the started event notification trigger. After the event processing component 70 detects the generation of a status change event as the trigger, the trigger data acquisition component 64 conducts event notification with respect to the client 90 via the database connection and returns the connection control to the client 90.

The event notification trigger component group 54 further can include a trigger interruption component 72. With respect to the event notification trigger to which an acquisition request has been already issued, the trigger interruption component 72 can interrupt the acquisition processing of the event notification in response to the interruption request from the client 90 even before the event processing component 70 detects the generation of the status change event, makes the trigger data acquisition component 64 execute an error response, and returns the database connection control to the client 90.

When the client 90 issues an acquisition request for event notification, the database connection used assumes a wait-state for response until a response to the issue is received. In the present embodiment, although described later in detail, the execution of acquisition processing of event notification can be cancelled at various timings, for example, acquisition processing can be interrupted upon receipt of a request from the client 90, and the database connection control can be returned to the client.

For instance, the above-stated event notification trigger component group 54 further can include a timer component (not illustrated in FIG. 2). The timer component starts to operate in response to an acquisition request for event notification, and measures a time from the starting. Then, in response to the expiration of a predetermined time period, the timer component can cancel the acquisition processing of the event notification, make the trigger data acquisition component 64 execute an error response, and return the connection control to the client 90.

Alternatively, in response to a disconnection request for database connection having a dependence relationship with the event notification trigger designated beforehand, the above-stated communication service component 56 may disconnect the database connection corresponding to the disconnection request, while canceling the execution of acquisition processing of the event notification having the dependence relationship, make the trigger data acquisition component 64 execute an error response, and return the control of the database connection corresponding to the acquisition request to the client 90.

The respective functional units of the server 10 illustrated in FIG. 2 may be implemented on the server 10 by deploying a program on the system memory 16 of the server 10, executing the program by the CPU 12 to operate and control the respective hardware resource. The above-stated trigger creation component 60, trigger start component 62, trigger data acquisition component 64, trigger deletion component 66, trigger stop component 68, event processing component 70, trigger interruption component 72 and timer component are implemented on the computer as a creation unit, a start unit, a notification unit, a deletion unit, a stop unit, a change detection unit, an interruption unit, and a timer unit, respectively. Similarly, the respective functional units of the client 90 also may be implemented on the client 90 by deploying a program on the system memory of the client 90, executing the program by a CPU to operate and control the respective hardware resource.

It should be noted here that the present embodiment has been exemplified as the DB system having a two-layer client server structure, which does not preclude the use of a multi-layer client server structure such as a three-layer client server structure where the above-stated user interface function unit 98 that an end-user actually uses is implemented on still another personal component (not illustrated). The present embodiment has been exemplified so that the server function is implemented on a single server computer, which does not preclude the use of distributed database architecture where individual DBMS processes are allowed to cooperate on a cluster including a plurality of server computers connected via a network to virtually realize a single DBMS function.

The following is a more detailed description of the event notification trigger function of the present embodiment.

(A) Brief Description of Event Notification Trigger Function

In the DB system of the present embodiment, the event notification trigger function is provided as follows: (1) firstly, as advance preparation, an event notification trigger is created using the trigger creation component 60, and definition data thereof is registered in the event notification trigger definition registration unit 58. During actual operation, (2) an application 94 requiring event notification issues a start request command of a trigger, and in response to the command, the trigger start component 62 reads out the definition to start the operation of the event notification trigger. (3) Subsequently, the application 94 issues an acquisition request command of the event notification via the database connection, and after the generation of the event, the trigger data acquisition component 64 conducts event notification in response to the acquisition request command.

(4) When the event notification of the trigger becomes unnecessary during operation, the application 94 issues a stop request command of trigger, and in response to the command, the trigger stop component 68 stops the operation of the event notification trigger. When the defined event notification trigger itself becomes unnecessary, (5) the definition of the event notification trigger is erased from the event notification trigger definition registration unit 58 using the trigger deletion component 66 to delete the registration from the system. The following is more detailed description on the event notification trigger function for each component of the server 10.

(B) Trigger Creation Component

Figure 3:
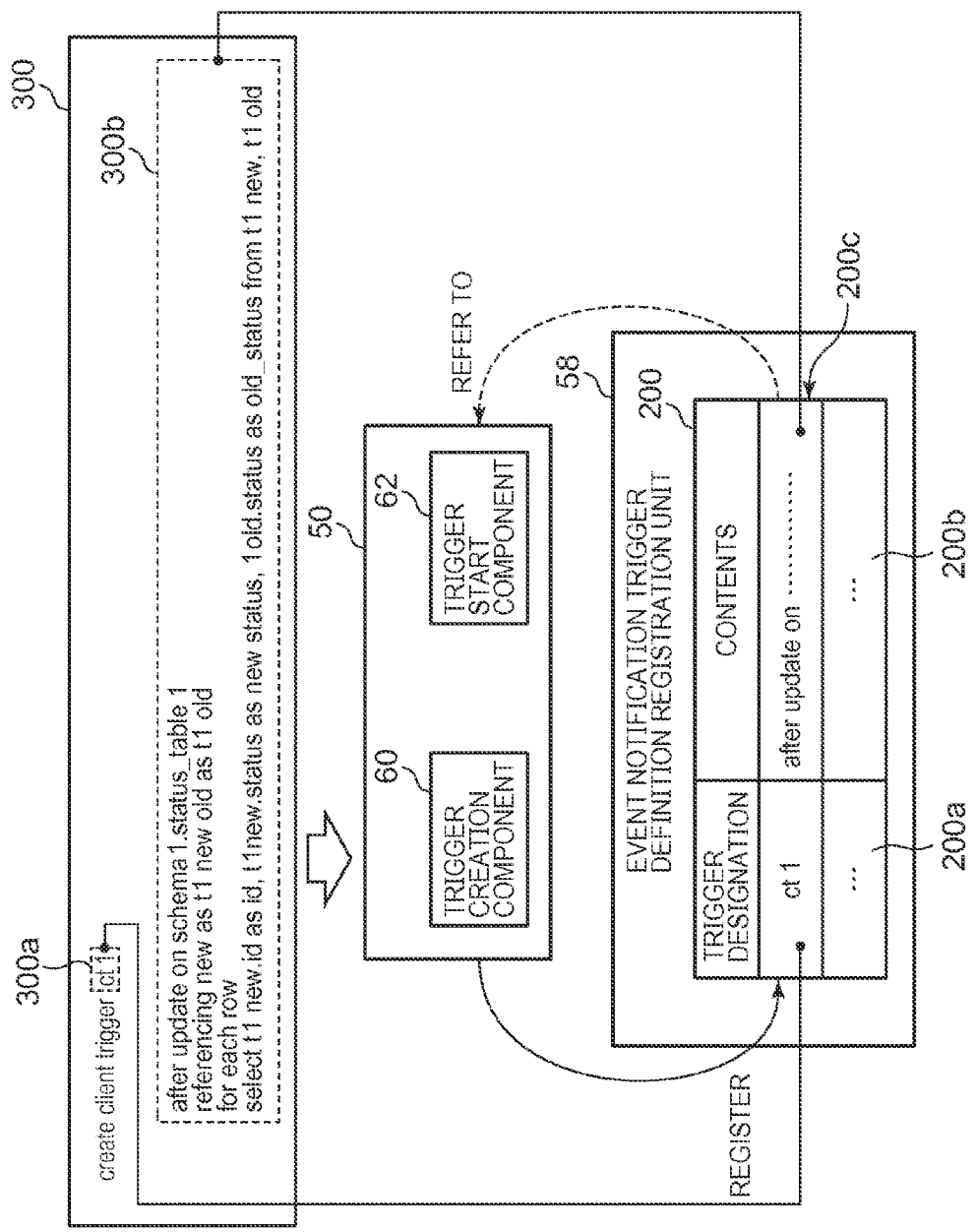
FIG. 3 schematically illustrates the processing executed by a trigger creation component according to an embodiment of the invention.

FIG. 3 schematically illustrates the processing executed by the trigger creation component 60. FIG. 3 illustrates a pseudo statement 300 that requires the creation of an event notification trigger having a designation of "ct1" 300a defined by contents 300b using a CREATE CLIENT TRIGGER syntax. Upon receipt of the statement 300 from the client or the like, the DBMS 50 interprets the statement 300 and invokes the trigger creation component 60 to pass the processing thereto. The trigger creation component 60 registers the event notification trigger defined by the contents 300b in the event notification trigger definition registration unit 58. The contents 300b of the statement 300 contain definition of a status change event as a trigger of the event notification and an action invoked in response to the generation of the event as the trigger. The status change event as the trigger is defined as an operation of INSERT, UPDATE or DELETE with respect to a designated table. The action invoked in response to the generation of the status change event as the trigger may include a statement using a SELECT syntax, and an execution result thereof is passed to the application requiring the event notification. According to the above-stated action, in the case of INSERT, an added value can be returned to the client, in the case of DELETE, a deleted value can be returned, and in the case of UPDATE, a value before update and a value after update, or at least one of them can be returned. A column of setting an event generation date and time may be added separately thereto. The contents 300b further may include designation of pre-trigger or post-trigger, designation of a correlation name, designation of trigger granularity and the like.

An event notification trigger definition table 200 illustrated in FIG. 3 is stored in the event notification trigger definition registration unit 58, which includes a field 200a for inputting a trigger designation, and a field 200b for inputting contents thereof, thus registering an event notification trigger. In the example of FIG. 3, an entry 200c is created using the CREATE CLIENT TRIGGER syntax in which the definition corresponding to the designation 300a and the contents 300b is input. The thus created event notification trigger is perpetually registered in the event notification trigger definition table 200 unless it is deleted by a deletion request, which will be referred to when the operation of the event notification trigger is started or when the action of the event notification is invoked.

(C) Trigger Start Component

Figure 4:
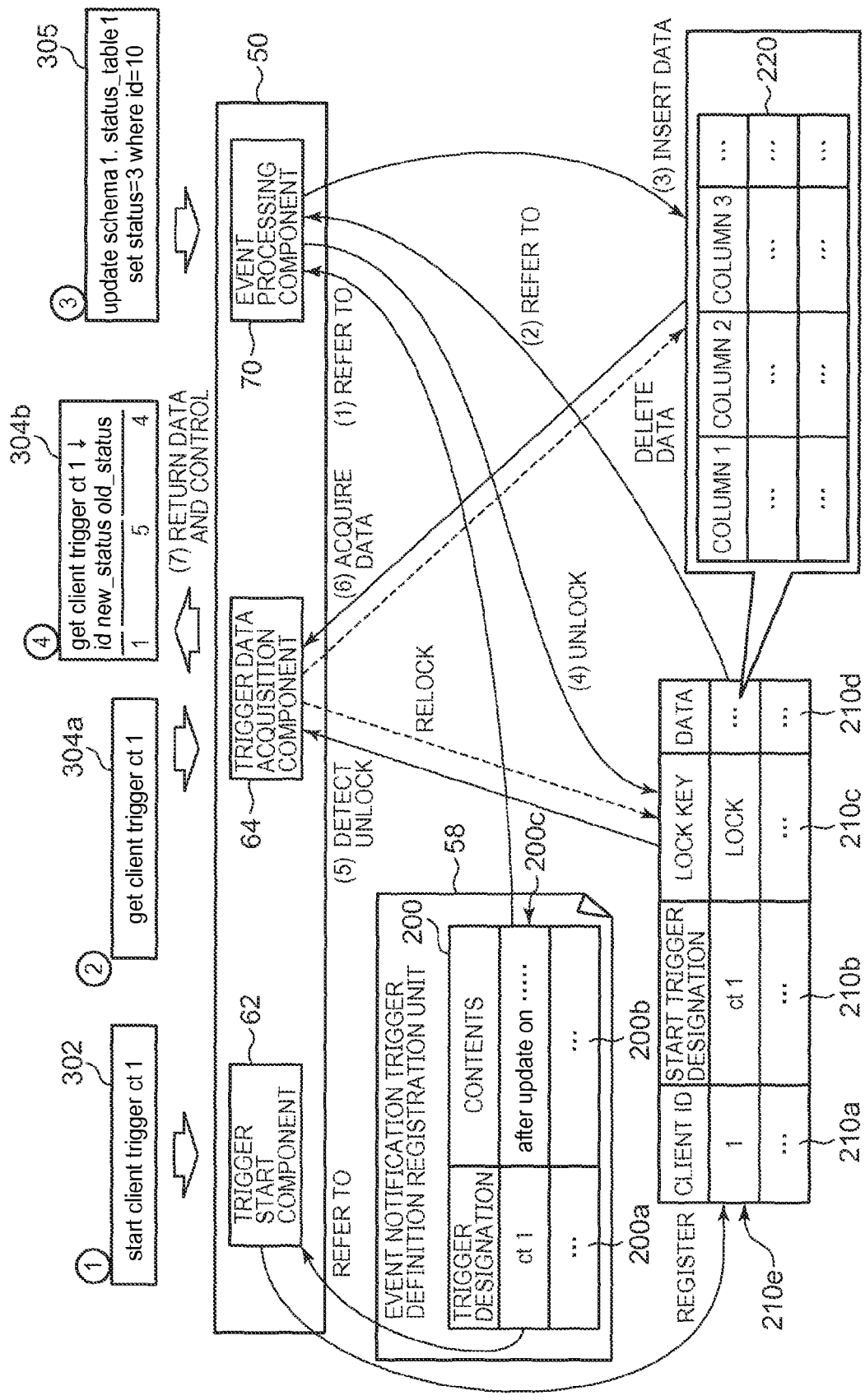
FIG. 4 schematically illustrates the processing executed by a trigger start component, a trigger data acquisition component and an event processing component according to an embodiment of the invention.

FIG. 4 schematically illustrates the processing executed by the trigger start component 62, the trigger data acquisition component 64 and the event processing component 70. Firstly, the processing by the trigger start component 62 will be described below. FIG. 4 illustrates a pseudo statement 302 instructing to start the operation of an event notification trigger having a designation "ct1" using a START CLIENT TRIGGER syntax. Upon receipt of the statement 302 from the client, the DBMS 50 invokes the trigger start component 62 to pass the processing thereto. The trigger start component 62 refers to the table 200 of the event notification trigger definition registration unit 58 to read out corresponding contents, adds an entry to a table 210 (hereinafter referred to as an operation trigger registration table) keeping information on the event notification trigger during operation to prepare a data region for response processing to an acquisition request for the event notification.

The operation trigger registration table 210 illustrated in FIG. 4 includes a field 210a, a field 210b, a field 210c, and a field 210d, where the field 210a is for inputting a client ID that identifies a client that issues a start request, the field 210b is for inputting a designation of the started trigger, the field 210c is for inputting a status value of a lock key and the field 210d is for inputting a pointer to result output data 220 of the action. The result output data 220 is configured as a temporary table on the memory or the database, which is secured for storing a result output from the action invoked in response to event generation as a trigger. The above-stated lock key keeps a value corresponding to a lock state or an unlock state, where it is set as the lock state during standby before event generation, while being set as the unlock state in response to the generation of the corresponding status change event.

In the example of FIG. 4, the START CLIENT TRIGGER syntax causes the insertion of the client ID "1" and the trigger designation "ct1" to an entry 210e. In the field 210c and the field 210d of the newly inserted entry 210e, a lock key with a "lock state" set thereto as an initial value and a pointer to a null temporary table for keeping a trigger processing result are input, respectively. The thus created entry 210e of the event notification trigger keeps information on the event notification trigger during operation in the operation trigger registration table 210 until the processing is stopped by a stop request, the connection with the client that issues the request is disconnected by a DISCONNECT request or the like, or the processing has been completed. It should be noted here that the present embodiment is configured so that the event notification trigger during operation is identified in accordance with the client ID or the trigger designation, and a common event notification trigger can be used for operation among a plurality of clients.

(D) Trigger Data Acquisition Component

The processing by the trigger data acquisition component 64 will be described below. FIG. 4 illustrates a pseudo statement 304a instructing to acquire event notification of an event notification trigger having a trigger designation "ct1" using a GET CLIENT TRIGGER syntax. The DBMS 50 receives the statement 304a from the client 90 via the database connection, and invokes the trigger data acquisition component 64 to pass the processing thereto.

The trigger data acquisition component 64 monitors a lock key field 210c in the corresponding entry in the operation trigger registration table 210, and waits for unlock. When it is detected that the lock key field 210c is rewritten to be the unlock state by the event processing component 70 described later, the trigger data acquisition component 64 acquires the result output data 220 using the pointer of the filed 210d, and returns the event notification including the result output data 220 in response to the above-stated statement 304a to the client 90. FIG. 4 illustrates a response 304b to the statement 304a. After the event notification, the trigger data acquisition component 64 rewrites the lock key field 210c in the corresponding entry to be a lock state again in preparation for the following processing, and erases the contents of the corresponding result output data 220.

(E) Event Processing Component

The following describes the processing by the event processing component 70. When insert, update, or delete of data has been conducted with respect to any table of the database, the event processing component 70 is notified of such. The event processing component 70 checks the event notification trigger definition table 200 as to whether or not the table subjected to the operation is used by the action as the trigger, and checks the operation trigger registration table 210 as to whether or not the corresponding trigger is started by one or more clients. If the definition of the corresponding trigger exists and if the trigger is started, then the action is executed, data obtained as a result of the execution is added to the result output data 220 managed by the field 210d, which corresponds to all clients that start the trigger, and unlocks the lock key 210c. Herein, the processing of detecting the generation of the status change event by the event processing component 70 itself can be conducted using mechanism similar to the conventional DBMS trigger function.

(F) Event Notification Processing

The following describes event notification processing implemented cooperative operation of the trigger start component 62, the trigger data acquisition component 64, and the event processing component 70. In response to a start request for the operation of the event notification trigger from the client 90, such as the statement 302 of FIG. 4, the trigger start component 62 inserts an entry to the operation trigger registration table 210. Thereby, the generation of the status change event corresponding to the trigger will be detected by the event processing component 70. Meanwhile, in response to an acquisition request of the event notification from the client 90 such as the statement 304a of FIG. 4, the trigger data acquisition component 64 starts to monitor a lock key field 210c in the corresponding entry of the operation trigger registration table 210 and assumes a wait-state for unlock.

When there is a request for the operation to a table such as a statement 305 of FIG. 4, the event processing component 70 (1) refers to the event notification trigger definition table 200 to confirm the definition of the trigger corresponding to the generated status change event, (2) further refers to the operation trigger registration table 210 to confirm that the trigger corresponding to the status change event is started and judges that the status change event corresponding to the trigger is generated, and (3) invokes the action corresponding to and defined in the contents 200b, acquires a result output and inserts the result output to the result output data 220 if data of 1 record or more exists as the output. At this time, even when a plurality of clients start a common trigger, the event processing component 70 inserts the result output to the result output data 220 of all clients that issue a request by the execution of the action conducted once for each event. After data insertion, (4) the event processing component 70 rewrites the field 210c in the corresponding entry of the operation trigger registration table 210 from a lock state to an unlock state.

The trigger data acquisition component 64 waiting for unlock (5) detects the rewriting of the field 210c to be the unlock state, (6) acquires the corresponding result output data 220, and (7) conducts event notification including the result output data 220 to the client 90 that issues the acquisition request. Herein, since the event processing component 70 detects generation of a status change event concerning the event notification trigger from the beginning of the operation of the event notification trigger, the result output data 220 may be already inserted and rewritten as the unlock state prior to the acquisition request for the event notification. In this case, in response to the acquisition request for the event notification, the event notification including the result output data 220 will be immediately conducted.

Figure 6:
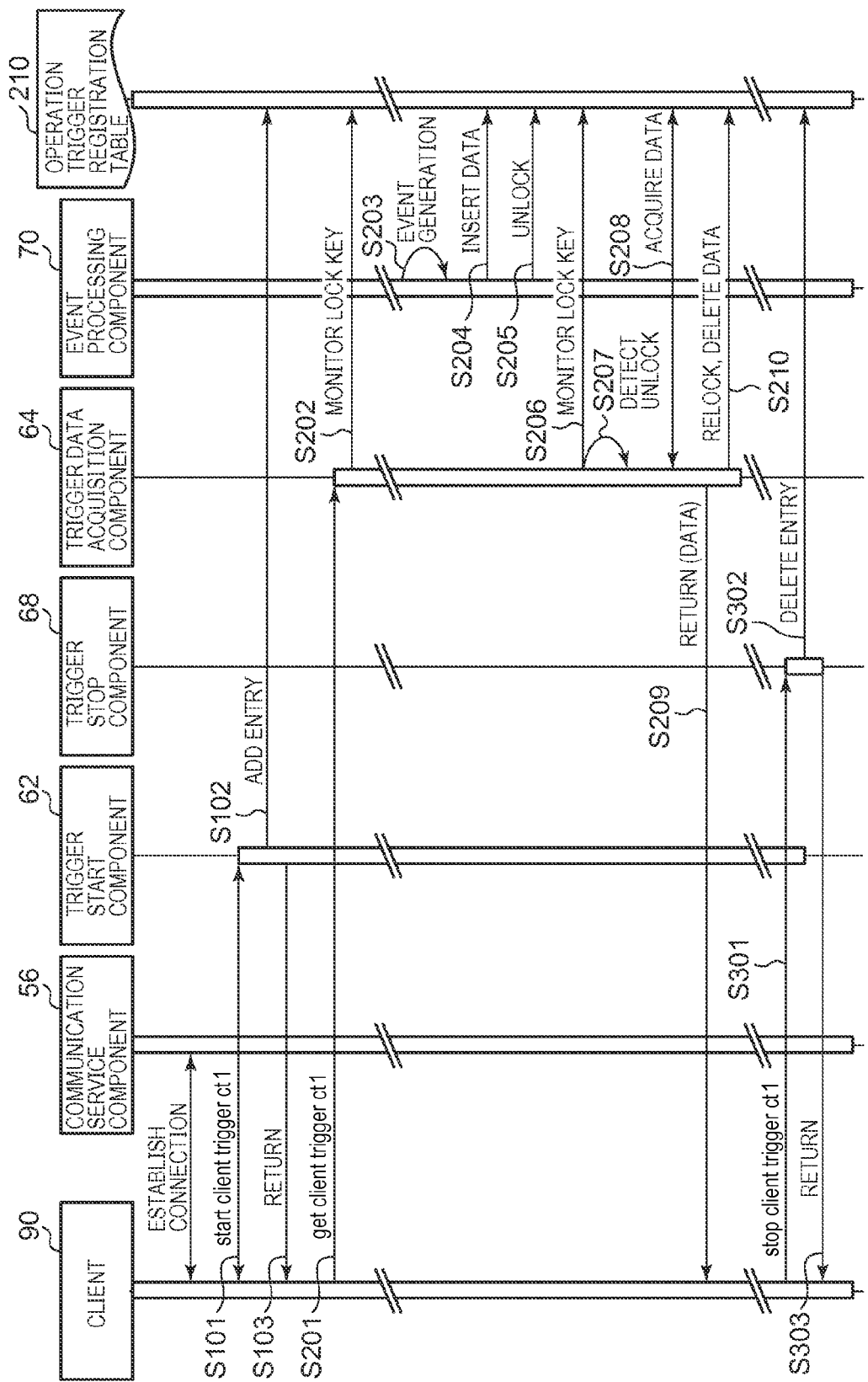
FIG. 6 illustrates sequence of the operation of an event notification trigger function according to an embodiment of the invention.

FIG. 6 illustrates sequence of the operation of the event notification trigger function. The processing from Step S101 to Step S103 illustrated in FIG. 6 corresponds to the starting processing of the event notification trigger, and the processing from Step S201 to Step S210 corresponds to the event notification processing.

In the example of FIG. 6, at Step S101, the client 90 issues a trigger start request using a START CLIENT TRIGGER statement via database connection established beforehand. At Step S102, in response to the trigger start request, the trigger start component 62 reads out definition data of the designated event notification trigger from the table 200 adds an entry to the operation trigger registration table 210, and at Step S103 returns a response to the start request to the client 90 via the same database connection. As a result of the processing from Step S101 to Step S103, the operation of the designated event notification trigger is started, so that the status change event corresponding to the started trigger becomes a target of the detection by the event processing component 70, thus assuming a status capable of receiving an acquisition request for the event notification.

The following describes the event notification processing in response to the acquisition request for the event notification. In the example of FIG. 6, at Step S201, the client 90 issues an acquisition request for event notification using a GET CLIENT TRIGGER syntax via the database connection established beforehand. At Step S202, the trigger data acquisition component 64 starts to monitor the lock key in the corresponding entry in response to the acquisition request, and waits for unlock. The event processing component 70 detects event generation at step S203, and invokes an action and inserts a result of execution to the result output data 220 at step S204. At Step S205, the event processing component 70 rewrites the field 210c in the corresponding entry of the operation trigger registration table 210 from a lock state to an unlock state.

At Step S206 as the timing after event generation, the trigger data acquisition component 64 monitors the lock key, and at Step S207 detects unlock. The trigger data acquisition component 64 acquires the result output data 220 at Step S208, and returns event notification including the acquired result output data 220 via the same database connection in response to the acquisition request to the client at Step S209. At Step S210, in order to handle the following acquisition request for event notification, the trigger data acquisition component 64 clears the contents of the result output data 220 and rewrites the lock key field 210c in the corresponding entry of the operation trigger registration table 210 to be a lock state again.

(G) Trigger Stop Component

Figure 5:
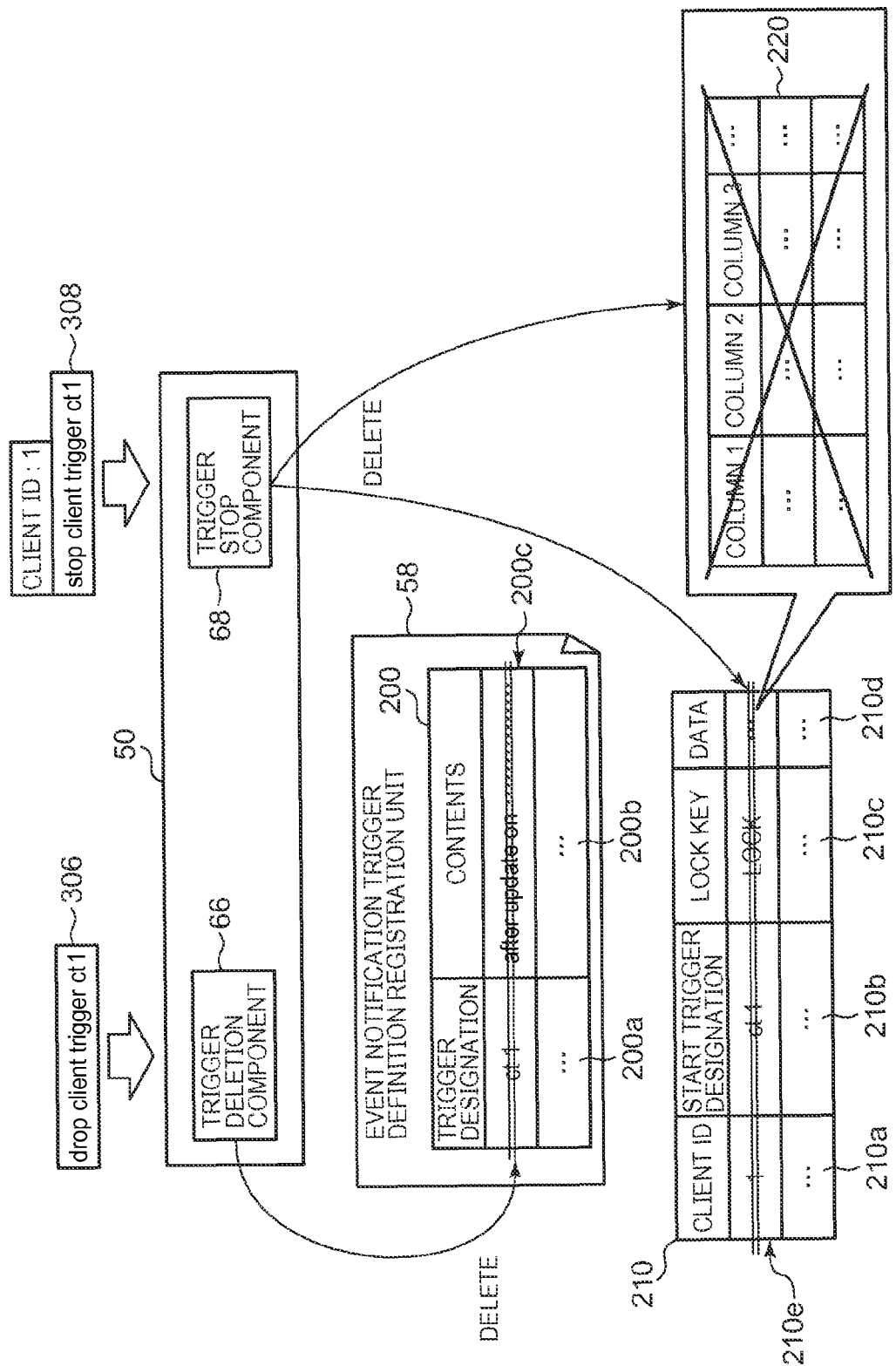
FIG. 5 schematically illustrates the processing executed by a trigger deletion component and a trigger stop component according to an embodiment of the invention.

FIG. 5 schematically illustrates the processing executed by the trigger deletion component 66 and the trigger stop component 68. Firstly, the processing by the trigger stop component 68 will be described below. FIG. 5 illustrates a pseudo statement 308 instructing to stop the operation of an event notification trigger having a designation of "ct1" using a STOP CLIENT TRIGGER syntax. FIG. 5 further illustrates that the statement 308 is issued from the client with the client ID "1".

Upon receipt of the statement 308 from the client 90, the DBMS 50 invokes the trigger stop component 68 to pass the processing thereto. The trigger stop component 68 searches the corresponding entry 210e in the operation trigger registration table 210 based on the client ID and the trigger designation, and deletes the entry and the corresponding result output data 220 to stop the operation of the designated event notification trigger.

The processing from Step S301 to Step S303 illustrated in FIG. 6 corresponds to the stop processing of the event notification trigger. In the example of FIG. 6, at Step S301, the client 90 issues a trigger stop request using a STOP CLIENT TRIGGER statement via database connection established beforehand. At Step S302, in response to the trigger stop request, the trigger stop component 68 deletes entry of the designated event notification trigger from the operation trigger registration table 210, and at Step S303 returns a response to the stop request to the client 90 via the same database connection. As a result of the processing from Step S301 to Step S303, resource secured by the event notification trigger during operation is released. If event notification becomes necessary again, the client 90 will issue a start request for trigger again.

(H) Trigger Deletion Component

The following describes the processing by the trigger deletion component 66. FIG. 5 illustrates a pseudo statement 306 instructing to delete the operation of an event notification trigger having a designation of "ct1" using a DROP CLIENT TRIGGER syntax. Upon receipt of the statement 306 from the client 90, the DBMS 50 interprets the statement 306 and invokes the trigger deletion component 66 to pass the processing thereto. The trigger deletion component 66 deletes the corresponding entry 200c from the table 200 of the event notification trigger definition registration unit 58. The deletion processing by the trigger deletion component 66 causes the perpetuated event notification trigger to be deleted and the secured resource to be released.

(I) Cancellation of Event Notification Processing by Interruption Request

Figure 7:
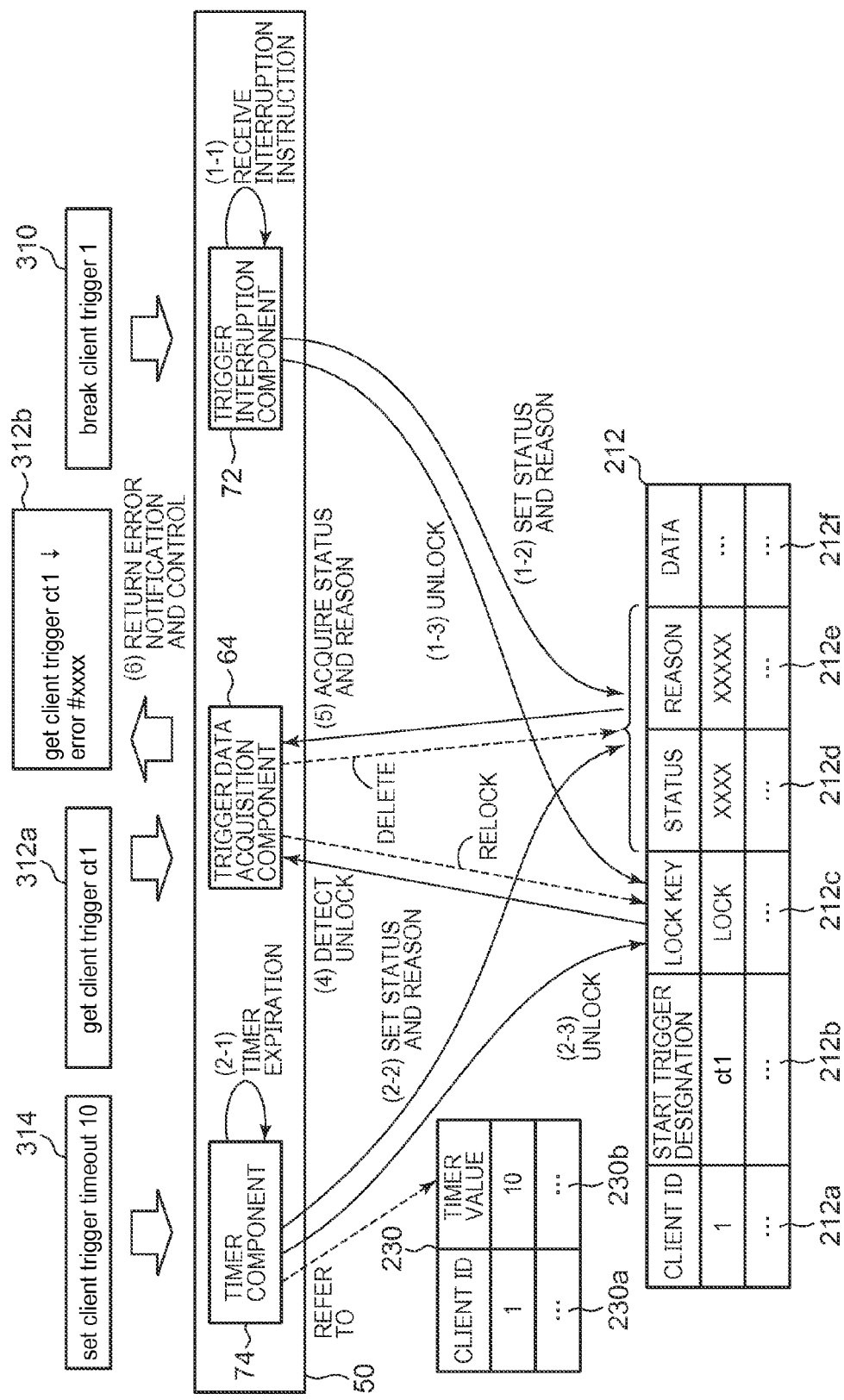
FIG. 7 schematically illustrates the processing executed by a trigger data acquisition component, a trigger interruption component, and a timer component according to an embodiment of the invention.

As described above, when the client 90 issues an acquisition request for event notification, the database connection used assumes a wait-state. In the present embodiment, at various timings in addition to the timing when the event notification is conducted in response to event generation and the connection control is returned, execution of acquisition processing can be cancelled and the connection control can be returned to the client 90. FIG. 7 schematically illustrates the processing executed by the trigger data acquisition component 64, the trigger interruption component 72, and the timer component 74. Firstly, the interruption operation of event notification processing by the trigger interruption component 72 will be described below.

FIG. 7 illustrates a pseudo statement 312a instructing to acquire event notification of the event notification trigger having a designation of "ct1" using a GET CLIENT TRIGGER syntax. FIG. 7 further illustrates an extended operation trigger registration table 212. The extended operation trigger registration table 212 includes a field 212a for inputting a client ID, a field 212b for inputting a designation of a started trigger, a field 212c for inputting a lock key status value, a field 212d for inputting an event notification status, a field 212e for inputting an error reason when the status shows an error, and a field 212f for inputting a pointer to the result output data 220 of the action. The above-stated extended operation trigger registration table 212 is prepared by the trigger start component 62 instead of the operation trigger registration table 210, when the system supports the trigger interruption component 72 and the timer component 74.

The DBMS 50 receives the statement 312a from the client 90 via database connection, and invokes the trigger data acquisition component 64 to pass the processing thereto. In response to the acquisition request for event notification like the statement 312a of FIG. 7, the trigger data acquisition component 64 assumes a wait-state for unlock as stated above.

During the wait-state of the database connection used for the acquisition request for event notification, the client 90 can issue a statement 310 illustrated in FIG. 7 via different database connection. Upon receipt of the statement 310, the DBMS 50 invokes the trigger interruption component 72 to pass the processing thereto. Note here that the statement 310 of FIG. 7 is a pseudo statement instructing to interrupt the event notification acquisition from the designated client (client ID1), which is written using a BREAK CLIENT TRIGGER syntax.

Upon receipt of the processing, the trigger interruption component 72 (1-1) receives the interruption instruction, (1-2) sets "error" in the status field 212d and "reason" in the reason field 212e (e.g., "interruption by another client (ID=xx)"). After they have been set, (1-3) the trigger interruption component 72 rewrites the field 212c in the corresponding entry of the operation trigger registration table 212 from a lock state to an unlock state.

The trigger data acquisition component 64 waiting for unlock (4) detects the rewriting of the field 212c to be the unlock state, (5) acquires the values of the status field 212d and the reason field 212e, and (6) if the status field 212d shows "error", conducts error notification including the reason input to the reason field 212e to the client 90 that issues the acquisition request.

Figure 8:
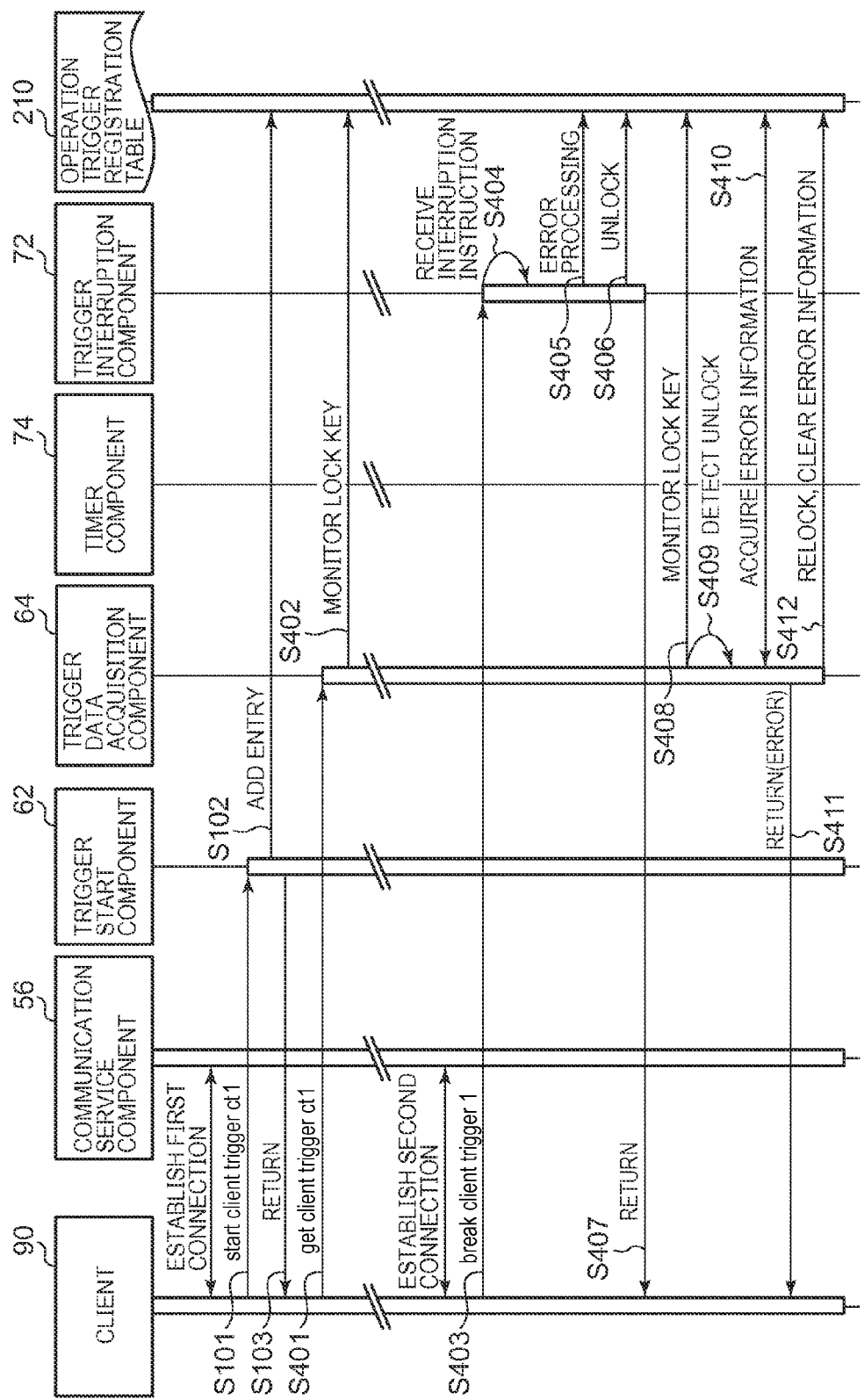
FIG. 8 illustrates sequence of the interruption operation of an event notification trigger according to an embodiment of the invention.

FIG. 8 illustrates sequence of the interruption operation of the event notification trigger. The processing from Step S101 to Step S103 of FIG. 8 corresponds to the starting processing of the event notification trigger, which is the same as that of FIG. 6, and therefore the description thereof has been omitted. The processing from Step S401 to Step S412 of FIG. 8 corresponds to the interruption operation of the event notification processing.

In the example of FIG. 8, at Step S401, the client 90 issues an acquisition request for event notification using a statement in a GET CLIENT TRIGGER syntax via first database connection established beforehand. At Step S402, in response to the acquisition request, the trigger data acquisition component 64 starts to monitor the lock key in the corresponding entry and waits for unlock.

In the example of FIG. 8, at Step S403, the client 90 issues an interruption request for event notification using a statement in a BREAK CLIENT TRIGGER syntax via second database connection established additionally. At Step S404, the trigger interruption component 72 receives the interruption instruction, and at Step 405 conducts error processing by setting predetermined values in the status field 212d and the reason field 212e. At Step 406, the trigger interruption component 72 rewrites the field 212c in the corresponding entry of the extended operation trigger registration table 212 to be an unlock state, and at Step S407 returns a response to the statement in the BREAK CLIENT TRIGGER syntax.

At Step S408, the trigger data acquisition component 64 monitors the lock key, and at Step S409 detects unlock. At Step S410, the trigger data acquisition component 64 refers to the status field 212d in the corresponding entry. When it is detected that the value shows "error", then the trigger data acquisition component 64 acquires error information in the field 212e. At Step S411 the trigger data acquisition component 64 returns error notification as a response to the acquisition request via the first database connection used for the acquisition request.

At Step S412, in order to handle the following acquisition request for event notification, the trigger data acquisition component 64 clears the status field 212d and the reason field 212e, and rewrites the lock key field 212c in the corresponding entry of the operation trigger registration table 212 to be a lock state again.

(J) Cancellation of Event Notification Processing by Timer

Referring again to FIG. 7, the interruption processing of the event notification processing by the timer component 74 will be described below. FIG. 7 illustrates a pseudo statement 314 setting a time-out time for the acquisition processing of the event notification of the event notification trigger using a SET CLIENT TRIGGER TIMEOUT syntax. FIG. 7 further illustrates a timer setting table 230 referred to by the timer component 74 when the timer is operated. The timer setting table 320 includes a field 230a for inputting a client ID, and a field 230b for inputting a timer value of the event notification in association with the client. Upon receipt of the statement 314 from the client 90, the DBMS 50 rewrites a value of the entry corresponding to the client issuing the request in the timer setting table 230 of the event notification trigger. Herein, the field 230b includes a default value set thereto, which can be controlled for change when the client designates explicitly using a SET CLIENT TRIGGER TIMEOUT syntax.

Further, upon receipt of the statement 312a from the client 90 via database connection, the DBMS 50 invokes the trigger data acquisition component 64 and passes the processing thereto. The trigger data acquisition component 64 assumes a wait-state for unlock in response to the acquisition request for event notification from the client 90. In response to the acquisition request for event notification from the client 90, the timer component 74 refers to the timer setting table 230 to acquire the timer value in the entry corresponding to the client 90 issuing the request, and makes the timer operate while setting the acquired timer value as expiration limit.

While the database connection used for the acquisition request for the event notification assumes a wait-state, the timer component 74 keeps time until the timer is expired or interrupted, or an event is generated. If the timer is expired before the event processing component 70 detects the generation of a status change event and before the trigger interruption component 72 receives the above-stated interruption request, the timer component 74 (2-1) detects the expiration of the timer, and (2-2) sets "error" in the status field 212d and the reason (e.g., "timer (10 sec. expiration)") in the reason field 212e of the operation trigger registration table 212. After they have been set, (2-3) the timer component 74 rewrites the field 212c in the corresponding entry of the operation trigger registration table 212 from a lock state to an unlock state.

The trigger data acquisition component 64 waiting for unlock (4) detects the rewriting to be the unlock state, (5) acquires the values of the status field 212d and the reason field 212e, (6) if the status field 212d shows "error", conducts error notification as a response 312b including the reason input to the reason field 212e to the client 90 that issues the acquisition request, and then the timer component 74 stops. When the event processing component 70 detects the generation of a status change event, or when the trigger interruption component 72 receives an interruption request, the above-stated processing corresponding to each case is conducted, thus making the timer component 74 stop.

Figure 9:
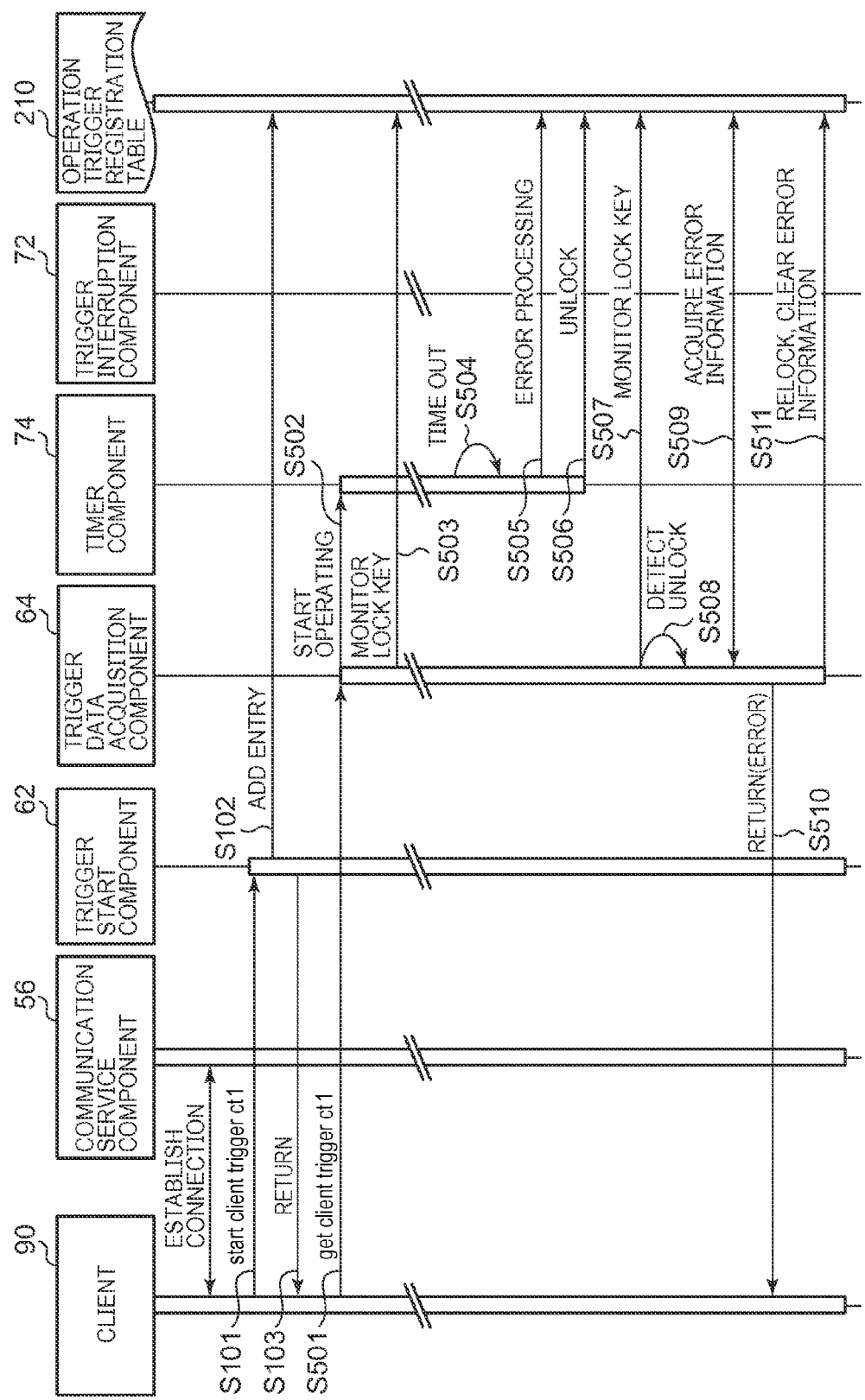
FIG. 9 illustrates sequence of the timer expiration operation of an event notification trigger according to an embodiment of the invention.

FIG. 9 illustrates sequence of the timer expiration operation of the event notification trigger. Since the processing from Step S101 to Step S103 illustrated in FIG. 9 corresponds to the starting processing of the event notification trigger, which is the same as that of FIG. 6, the description thereof has been omitted. The processing from Step S501 to Step S511 of FIG. 9 corresponds to the timer expiration operation of the event notification processing.

In the example of FIG. 9, at Step S501, the client 90 issues an acquisition request for event notification using a statement in a GET CLIENT TRIGGER syntax. At Step S502, the timer component 74 makes the timer operate in response to the acquisition request. At Step S503, the trigger data acquisition component 64 starts to monitor the lock key in response to the acquisition request and waits for unlock.

In the example of FIG. 9, the timer component 74 detects the timer expiration at Step S504, and sets predetermined values in the status field 212d and the reason field 212e of the operation trigger registration table 212 to conduct error processing at Step S505. At Step S506, the timer component 74 rewrites the field 212c in the corresponding entry to be an unlock state. At Step S507, the trigger data acquisition component 64 monitors the lock key field 212c, and at Step S508 detects unlock. At Step S509, the trigger data acquisition component 64 detects that the status field 212e in the corresponding entry shows "error", and acquires error information in the field 212e. At Step S510, the trigger data acquisition component 64 returns, to the client 90, error notification as a response to the acquisition request via the database connection used for the acquisition request.

At Step S511, in order to handle the following acquisition request for event notification, the trigger data acquisition component 64 clears the contents of the status field 212d and the reason field 212e and rewrites the lock key field 210c in the corresponding entry of the operation trigger registration table 212 to be a lock state again.

Figure 10:
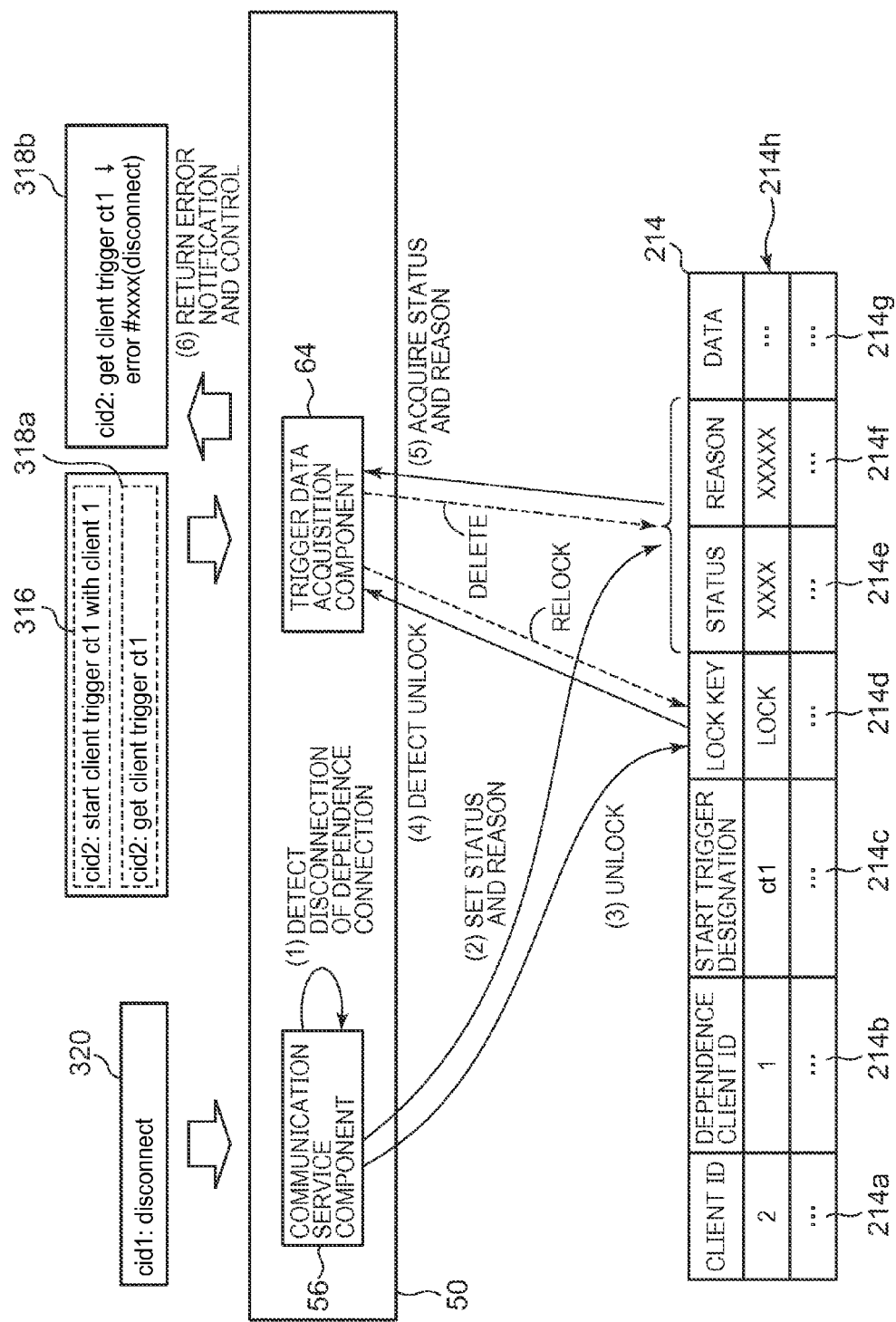
FIG. 10 schematically illustrates the processing executed by a communication service component and a trigger data acquisition component according to an embodiment of the invention.

(K) Cancellation of Event Notification Processing Depending on Disconnection of Database Connection Referring now to FIG. 10, the interruption operation of the event notification processing by the communication service component 56 will be described below. FIG. 10 schematically illustrates the processing executed by the communication service component 56 and the trigger data acquisition component 64. FIG. 10 illustrates a pseudo statement 316 instructing to start the operation of the event notification of the event notification trigger having a designation "ct1", which depends on designated database connection, using a START CLIENT TRIGGER syntax.

Upon receipt of the statement 316 from the client 90 via the database connection, the DBMS 50 invokes the trigger start component 62 to pass the processing thereto. The trigger start component 62 reads out the corresponding contents in the event notification trigger definition table 200, and adds an entry in an extended operation trigger registration table 214 to prepare a data region for the processing in response to an acquisition request for event notification.

FIG. 10 further illustrates the extended operation trigger registration table 214. Similarly to that illustrated in FIG. 8, the extended operation trigger registration table 214 includes a field 214a, a field 214c, a field 214d, a field 214e, a field 214f, and a field 214g for inputting a client ID, a designation of a start trigger, a status value of a lock key, an event notification status, an error reason, and a pointer, respectively. The extended operation trigger registration table 214 further includes a field 214b in which a client ID of database connection having a dependence relationship therewith is input, which is prepared by the trigger start component 62 when interruption in response to the database disconnection with the depending client ID is supported. In the example of FIG. 10, an entry 214h is added using a START CLIENT TRIGGER syntax, including the client ID "2", the depending client ID "1", and the start trigger designation "ct1" input thereto. That is, at the time when the START CLIENT TRIGGER is issued, the depending client ID has to connect with the database, and if it does not connect, an error occurs. To this end, a function enabling to acquire the number of the connecting client ID based on a return value at the connection, a statement newly introduced, or the like also is provided.

FIG. 10 further illustrates a pseudo statement 318a instructing to acquire event notification of an event notification trigger having a designation of "ct1". In FIG. 10, the pseudo statement issued by the client ID1 includes a description of "cid1:", and the pseudo statement issued by the client ID2 includes a description of "cid2:". Upon receipt of the statement 318a from the client 90 via the database connection (client ID: 2), the DBMS 50 invokes the trigger data acquisition component 64 to pass the processing thereto. In response to the acquisition request for the event notification from the client 90 like the statement 318a shown in FIG. 10, the trigger data acquisition component 64 assumes a wait-state for unlock.

During the wait-state for response of the database connection used for the acquisition request for event notification, the client 90 further can issue a statement 320 instructing to disconnect the database connection using a DISCONNECT syntax illustrated in FIG. 10 via different database connection (client ID: 1). Upon receipt of the statement 320, the DBMS 50 invokes the communication service component 56 to pass the processing thereto.

Upon receipt of the processing, the communication service component 56 refers to the operation trigger registration table 214 to detect the event notification trigger having a dependence relationship with the database connection to which the disconnection is requested, and (1) detects the disconnection of the dependency connection. The communication service component 56 further (2) sets "error" in the status field 214e and "reason" in the reason field 214f (e.g., "disconnection with the dependence client (ID=1)"). After they have been set, (3) the communication service component 56 rewrites the field 214d in the corresponding entry of the operation trigger registration table 214 from a lock state to an unlock state.

The trigger data acquisition component 64 waiting for unlock (4) detects the rewriting to be the unlock state, (5) acquires the values of the status field 214e and the reason field 214f, and (6) if the status field 214e shows "error", conducts error notification 318b including the reason input to the reason field 214f to the client 90 that issues the acquisition request.

Figure 11:
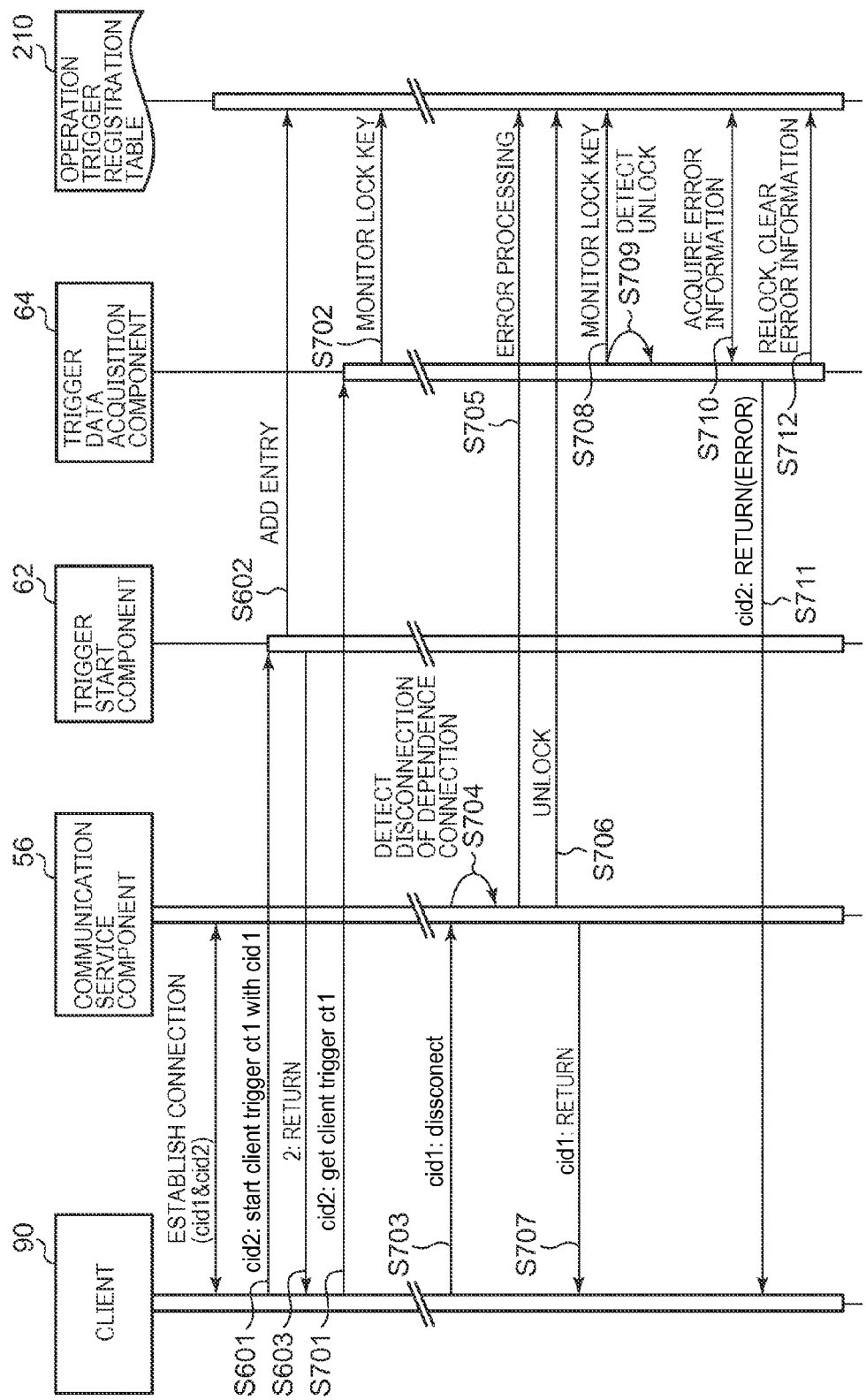
FIG. 11 illustrates sequence of the interruption operation of an event notification trigger depending on database connection according to an embodiment of the invention.

FIG. 11 illustrates sequence of the interruption operation of the event notification trigger depending on the database connection. The processing from Step S601 to Step S603 of FIG. 11 corresponds to the starting processing of the event notification trigger, and the processing from Step S702 to Step S712 corresponds to the interruption operation of the event notification processing.

In the example of FIG. 10, at Step S601, the client 90 issues a trigger start request depending on the database connection (client ID=1) using a START CLIENT TRIGGER statement via database connection established beforehand (client ID=2). At Step S602, in response to the trigger start request, the trigger start component 62 reads out definition data from the table 200, adds an entry including the ID for the dependence connection to the extended operation trigger registration table 214, and at Step S603 returns a response to the start request to the client 90 via the database connection (client ID=2). Then, the status change event corresponding to the started trigger becomes a target of the detection by the event processing component 70.

At Step S701, the client 90 issues an acquisition request for event notification using a statement in a GET CLIENT TRIGGER syntax via the database connection (client ID=2). At Step S702, the trigger data acquisition component 64 starts to monitor the lock key in the corresponding entry in response to the acquisition request, and waits for unlock.

At Step S703, the client 90 issues a disconnection request for database connection using a statement in a DISCONNECT syntax via the database connection (client ID=1). The communication service component 56 detects disconnection of the dependence connection at Step S704, conducts error processing by setting predetermined values in the status field 214e and the reason field 214f at Step S705. At Step 706, the communication service component 56 rewrites the field 214d in the corresponding entry of the operation trigger registration table 214 to be an unlock state, and at Step S707 returns a response to the statement in the DISCONNECT syntax, while conducting disconnection processing.

Since the processing from Step S708 to Step S712 is similar to the processing from S408 to S412 illustrated in FIG. 8, the detailed description thereof has been omitted. The trigger data acquisition component 64 detects unlock at Step S709, acquires the error information at Step S710, and returns error notification to the client as a response to the acquisition request via the database connection used for the acquisition request at Step S711. At Step S712, the trigger data acquisition component 64 clears the error information in the operation trigger registration table 214 and rewrites the lock key field 212d to be a lock state again.

As described above, in an embodiment of the present invention, when event notification of a database status change is required, the client 90 issues a start request for operation of event notification trigger and subsequently issues an acquisition request for the event notification. Thereby, the client 90 can receive the event notification in response to the generation of the status change event as requested using the database connection used for the acquisition request. At this time, there is no need for the server 10 to open a port for the event notification separately, there is no need to process the polling from the client 90, and there is no need of close cooperation among applications on the client 90 side. Thus, mechanism can be realized, capable of notifying of a client requiring the notification of a status change event of database, while keeping a low workload, high security, and high application independency.

According to the server 10 of the present embodiment, the trigger interruption component 72, the timer component 74, and the communication service component 56 function to end in cancellation of the acquisition processing of an event notification in response to the generation of an event serving a trigger of canceling the execution of the acquisition processing of the status change event notification, such as reception of an interruption request, timer expiration, and disconnection with dependence connection. Thus, even before detecting the status change satisfying acquisition request conditions, the client 90 can withdraw an acquisition request with a high degree of flexibility at various timings such as at a timing designated explicitly by an interruption request, at a timing when it reaches a predetermined timeout limit, and a timing when database connection with a dependence relationship designated beforehand is disconnected, thus making it possible to return the database connection control to the client 90.

As described above, an embodiment of the invention can provide an information management server that implements event notification mechanism for notifying, in response to a database status change such as insert, update or deletion of data, a client of such status change while keeping a low workload, high security, and high application independency, and can provide an information processing system including such an information management server, and a communication method and a program that the information management server executes.

To ensure the ease in understanding of the embodiments of the invention, each functional unit and the processing by each functional unit have been described above. However, instead of the execution of certain processing by the above-stated certain functional unit, a function for executing the above-stated processing may be assigned to any functional unit with consideration given to the processing efficiency and the implementation efficiency for programming.

The above-described functions may be embodied by a program that is executable by an apparatus and written in an object-oriented programming language such as, but not limited to, C++, Java®, Java®Beans, Java®Applet, Java®Script, Perl, or Ruby, or a database language such as SQL, which may be distributed or be transmitted for distribution by storing it in a device readable recording medium.

While the present invention has been described by way of specific embodiments, the present invention is not limited to the embodiments, and another embodiment, addition, change and deletion are all possible.

What is claimed is:

1. An information management server, comprising:
   a registration unit that registers a status change of a database and a notification action so that the status change and the notification action are associated with each other;
   a communication unit that receives an acquisition request for a status change notification via a database connection established over a network with respect to a client device;
   a change detection unit that detects generation of the status change, sets a lock key field to an unlock state upon detection of the status change and invokes the notification action associated therewith; and
   a notification unit that monitors the lock key field in response to receiving the acquisition request, and upon detection of an unlock state of the lock key field initiates the communication unit to send a notification including a result of the notification action for the acquisition request via the database connection as a response to the acquisition request, and returns control of the connection to the client.

2. The information management server according to claim 1, further comprising a cancellation unit that gives an acquisition error of the status change notification as the result in response to generation of an event serving as a trigger of canceling execution of acquisition processing of the status change notification.

3. The information management server according to claim 1, further comprising a timer unit that starts to operate in response to an acquisition request for the status change notification, and gives expiration of acquisition time-limit of the status change notification as the result in response to the expiration.

4. The information management server according to claim 1, further comprising an interruption unit that gives acquisition interruption of the status change notification as the result in response to an interruption instruction received via different database connection.

5. The information management server according to claim 1, wherein the communication unit gives acquisition interruption of the status change notification as the result in response to disconnection of database connection having a dependence relationship designated with the status change notification.

6. The information management server according to claim 1, further comprising:
   a creation unit that defines a status change notification including a status change serving as a trigger and a notification action and causes the status change notification to be stored persistently;
   a start unit that reads out the definition, sets the status change serving as the trigger as a target of detection by the change detection unit, and starts an operation of processing the status change notification; and
   a deletion unit that erases the definition and deletes the status change notification.

7. An information processing system comprising an information management server that manages a database, and a client that connects with the information management server via a network,
   wherein the information management server comprises:
   a registration unit that registers a status change of the database and a notification action so that the status change and the notification action are associated with each other;
   a communication unit that receives an acquisition request for a status change notification via database connection established with respect to the client;
   a change detection unit that detects generation of the status change, sets a lock key field to an unlock state upon detection of the status change and invokes the notification action associated therewith; and
   a notification unit that monitors the lock key field in response to receiving the acquisition request, and upon detection of an unlock state of the lock key field causes the communication unit to send a notification including a result of the notification action for the acquisition request via the database connection as a response to the acquisition request, and returns control of the connection to the client,
   wherein the client includes a client application that issues an acquisition request for the status change notification and executes processing in accordance with the notification acquired as the response to the acquisition request.

8. The information processing system according to claim 7, wherein the information management server further comprises a cancellation unit that gives an acquisition error of the status change notification as the result in response to generation of an event serving as a trigger of canceling execution of acquisition processing of the status change notification.

9. A communication method that is executed by an information management server connected with a client via a network, the information management server executing the steps of:
   receiving an acquisition request for a status change notification of a database via database connection established with respect to the client;
   detecting generation of a status change that is registered in the database, setting a lock key field to an unlock state upon detection of the status change and referring to registration that associates the status change with a notification action to invoke the associated notification action;
   monitoring the lock key field in response to receiving the acquisition request; and
   sending a notification including a result of the notification action for the acquisition request via the database connection as a response to the acquisition request and detection of an unlock state of the lock key field, and returning control of the connection to the client.

10. The communication method according to claim 9, wherein the information management server further executes the step of giving an acquisition error of the status change notification as the result in response to generation of an event serving as a trigger of canceling execution of acquisition processing of the status change notification.

11. The communication method according to claim 9, wherein the information management server further executes the steps of:
   starting a timer to operate in response to an acquisition request for the status change notification, and;
   giving expiration of acquisition time-limit of the status change notification as the result in response to the expiration of the timer.

12. The communication method according to claim 9, wherein the information management server further executes the step of giving acquisition interruption of the status change notification as the result in response to an interruption instruction received via different database connection.

13. The communication method according to claim 9, wherein the information management server further executes the step of giving acquisition interruption of the status change notification as the result in response to disconnection of database connection having a dependence relationship designated with the status change notification.

14. A program that is recorded in a computer-readable recording medium and is executable by a computer, the program causing the computer to implement:
   a registration unit that registers a status change of a database and a notification action so that the status change and the notification action are associated with each other;
   a communication unit that receives an acquisition request for a status change notification via database connection established with respect to the client;
   a change detection unit that detects generation of the status change, sets a lock key field to an unlock state upon detection of the status change and invokes the notification action associated therewith; and
   a notification unit that monitors the lock key field in response to receiving the acquisition request, and upon detection of an unlock state of the lock key field causes the communication unit to send a notification including a result of the notification action for the acquisition request via the database connection as a response to the acquisition request, and returns control of the connection to the client.

15. The program according to claim 14, further causing the computer to implement a cancellation unit that gives an acquisition error of the status change notification as the result in response to generation of an event serving as a trigger of canceling execution of acquisition processing of the status change notification.

16. An information management server connected with a client via a network, comprising:
   a registration unit that registers a status change of a database and a notification action so that the status change and the notification action are associated with each other;
   a communication unit that receives an acquisition request for a status change notification via database connection established with respect to the client;
   a change detection unit that detects generation of the status change, sets a lock key field to an unlock state upon detection of the status change and invokes the notification action associated therewith;
   a notification unit that monitors the lock key field in response to receiving the acquisition request, and upon detection of an unlock state of the lock key field causes the communication unit to send a notification including a result of the notification action for the acquisition request via the database connection as a response to the acquisition request, and returns control of the connection to the client;
   a timer unit that starts to operate in response to an acquisition request for the status change notification, and gives expiration of acquisition time-limit of the status change notification as the result in response to the expiration;
   an interruption unit that gives acquisition interruption of the status change notification as the result in response to an interruption instruction received via different database connection;
   a creation unit that defines a status change notification including a status change serving as a trigger and a notification action and causes the status change notification to be stored persistently;
   a start unit that reads out the definition, sets the status change serving as the trigger as a target of detection by the change detection unit, and starts an operation of processing the status change notification; and
   a deletion unit that erases the definition and deletes the status change notification,
   wherein the communication unit gives acquisition interruption of the status change notification as the result in response to disconnection of database connection having a dependence relationship designated with the status change notification.

* * * * *